United States Patent [19]

Senneville

[11] 4,423,694
[45] Jan. 3, 1984

[54] PAD FOR SETTING CONCRETE

[76] Inventor: Bertrand Senneville, 20 du Rhone, app. 415, St-Lambert, Quebec, Canada, J4S 1X4

[21] Appl. No.: 437,120

[22] Filed: Oct. 27, 1982

[30] Foreign Application Priority Data

Nov. 6, 1981 [CA] Canada ............................. 389604

[51] Int. Cl.³ ........................................ B32B 7/08
[52] U.S. Cl. ............................ 112/405; 112/441; 264/31; 264/79; 264/DIG. 43; 404/72; 428/71; 428/137; 428/157; 428/159; 428/189; 428/193; 428/314.4; 428/314.8; 428/318.6; 428/319.3
[58] Field of Search ................. 112/405, 441; 264/31, 264/79, DIG. 43; 404/72; 428/57, 71, 137, 157, 159, 189, 193, 314.3, 314.8, 318.6, 319.6

[56] References Cited

U.S. PATENT DOCUMENTS

| | | |
|---|---|---|
| 1,768,366 | 6/1930 | McKesson . |
| 1,841,928 | 1/1932 | Anderson . |
| 1,841,931 | 1/1932 | Weber . |
| 1,909,177 | 5/1933 | Honegger . |
| 1,965,111 | 7/1934 | Angier . |
| 1,999,152 | 4/1935 | Finley . |
| 2,003,988 | 6/1935 | Angier . |
| 2,033,989 | 3/1936 | Levine . |
| 3,649,725 | 3/1972 | Olson . |

FOREIGN PATENT DOCUMENTS 2105302  8/1971  Fed. Rep. of Germany .

Primary Examiner—James C. Cannon
Attorney, Agent, or Firm—Bacon & Thomas

[57] ABSTRACT

The invention relates to a pad for concrete intended to appreciably reduce the setting time of concrete. This pad comprises an essentially water an air tight flexible cover enclosing a heat insulating cushion resting directly over a lower part intended to be laid in contact with the surface of concrete. This lower part is made up of ribbons woven together in the form of a network in such a manner as to have a good mechanical resistance to wear by friction and so as to create a zone between the heat insulating cushion and the surface of the concrete capable of allowing the excess water oozing through the concrete surface to flow only slowly away, thereby avoiding the need of water from an outside source, allowing also the heat resulting from the setting reaction of concrete to accumulate inside the interstices of said network thus to accelerate the setting of the concrete. This pad is particularly useful and efficient during the year's period of cold weather where the setting of concrete is particularly long.

11 Claims, 2 Drawing Figures

PAD FOR SETTING CONCRETE

BACKGROUND OF THE INVENTION

The present invention relates to a pad for concrete intended to recuperate and accumulate, at the surface of the concrete, the heat resulting from the setting reaction for reducing thereby its setting time, and to retain on the same surface a certain amount of water so that the setting of concrete near the surface may not be too fast with respect to the setting of concrete occuring inside the mass of concrete.

It is well known to those skilled in the art that the setting reaction of concrete when carried out under normal temperature condition, is directly proportional to the temperature at the surface of concrete. Therefore, it becomes obvious that any increment of this temperature at the surface of concrete, with respect to the one of the surrounding medium (i.e. the atmospheric temperature), will decrease accordingly the setting time of concrete.

Of course, such a reduction in the setting time of concrete constitutes an advantage which may become of the utmost importance for the men of the art when early dismounting of the concrete forms or early walking thereon is required.

It is also well known to those skilled in the art that during the setting of a concrete, freshly cast in a wet state mixture, the concrete near the surface has a setting time shorter than the one located inside the mass of concrete. This may be explained by the fact that the mixing water contained in the concrete and located near its surface can be easily evacuated toward the outside of concrete and thus contributes to make the setting of this concrete fast and easy. However, when this surface of concrete becomes set, it becomes also impervious to the mixing water still contained in the mass of concrete so that, this mixing water becomes trapped inside the concrete since it cannot ooze through said hardened or set surface of concrete. Furthermore, this so trapped mixing water may cause an excessive increase of pressure in the concrete and accordingly cause its cracking.

Up to now, the aforesaid inconvenience is overcome by the addition of a certain amount of water on the surface of the concrete which then remains in a partial setting state, and thus allows the mixing water contained inside the concrete to ooze through the surface. The water needed for this purpose may either come from inside of concrete (i.e. the mixing water) or obtained from a conventional water supply.

It is also well known to those skilled in the art that any modification of the above-mentioned parameters may accordingly modify the qualities and characteristics of the resulting concrete.

Numerous differents devices are known to reduce the setting time of concrete or to reduce the ratio between the setting time of concrete near the surface and that inside of the mass of concrete, or a combination of the above-mentioned two possibilities.

In U.S. Pat. No. 3,649,725, concrete freshly cast into a form is heated at its surface by means of an electric heating blanket mounted on the outside parts of walls defining the form. This heating blanket allows to reduce the setting time of concrete and is constituted by a network of electric heating elements uniformly distributed between a lattice material put in direct contact with the walls of the form and a layer of isolating material which is itself coated with a moisture resistant sheet on either side thereof.

German Pat. No. 2,105,302 describes a heating pad for concrete provided with a heating device for reducing the setting time of concrete and a hydratation device of the surface of concrete so as to avoid too fast a setting of concrete near the surface with respect to the setting of concrete occuring inside the mass of concrete. The pad for concrete according to German Pat. No. 2,105,302, is mainly constituted of an impervious envelope which has its lower part put in direct contact with the surface of concrete, which part shows several perforations across its thickness. Inside this envelope are disposed a network of electric heating elements, a spongy lining able to absorb or desorb water and put in direct contact with the concrete via said perforations of the lower part of pad, and a network of channels for carrying water or steam, said channels being advantageously perforated to soak the aforesaid spongy lining.

U.S. Pat. No. 2,033,989, describes a pad for concrete allowing to avoid too fast a setting of concrete near its surface by lying on said surface a layer of a fibrous material wrapped inside an envelope made of woven material. This pad is particularly intended to reduce the rate of evaporation of mixing water accumulated at the surface of concrete so that during a certain period of time, a partial setting state for the surface of concrete be assured, and that the mixing water contained inside the concrete may oozed through its surface. However, it may become necessary under the circumstances to add some water from a conventional water supply to assure thereby an adequate hydration of the surface of concrete.

U.S. Pat. No. 1,999,152 describes a pad for concrete intended to be laid on the surface of a freshly cast concrete so as to avoid too great an evaporation rate of the mixing water accumulated on the surface of concrete and coming from the inside of concrete by oozing through its surface. The pad as described in this United States patent consists of a waterproof upper part, an intermediary layer which is also impervious to water and a lower part permeable to water and which is either put in direct contact with the concrete or slightly raised above its surface to define a gap in which the excess water may flow away.

U.S. Pat. No. 1,768,366 discloses a pad for concrete intended to maintain a certain amount of water on the surface of freshly cast concrete so that the surface may remain in a partial setting state to allow the mixing water contained inside the concrete to ooze to its surface. The pad according to U.S. Pat. No. 1,768,366 is made up of a first layer made of a fibrous and absorbent material put in direct contact with the surface of concrete and a second layer itself made of two distinct layers and laid onto the aforesaid layer. Furthermore, the so resulting pad shows between each of its second layers some cavities or spaces intended to receive water from a conventional water supply and to assure thereby a partial setting state for the surface of concrete.

SUMMARY OF THE INVENTION

I find that each device or pad for concrete, described in the above prior art, have the disadvantage of requiring either electricity, for reducing the setting time of concrete and specialized men for their installation and/or use, or the availability of water to avoid too fast a setting of the concrete near its surface with respect to the setting occuring inside the concrete. While these devices or pads are simple and easy to use, they are principally intended to increase the setting time of the concrete near its surface, over which they are laid, with respect to the one occuring inside the concrete.

Consequently, there still exists a need for a pad for concrete capable of both appreciably reducing the general setting time of concrete while avoiding that it sets too fast at its surface, with respect to the setting occuring inside its mass. Furthermore, this pad should be easy to handle and install so as not to require skilled labor, in use. It should also not require electricity or water other than that contained in the concrete itself.

The present invention lies in a pad for concrete having the aforesaid characteristics. The pad of the invention makes it possible to appreciably reduce the setting time of the concrete while ensuring an adequate amount of water on its surface so that the latter may remain into a partial setting state. For this purpose, the pad of the invention has a water and air tight flexible cover lying over a central heat insulating cushion which rests on a lower part intended to be put in direct contact with the surface of concrete, the characterizing features of this pad being that the said lower part is obtained by ribbons woven together in the form of a network in such a manner as to have a good mechanical resistance to wear by friction and as to create a zone between the central insulating cushion and the surface of the concrete capable of allowing the excess of water oozing through the concrete surface to flow away only slowly so that no water from an outside source be necessary, while the heat resulting from the setting reaction may accumulate inside the interstices of the network to raise the temperature at the surface of concrete and reduce thereby the setting time of concrete.

Thus, in accordance with the broad concept of the present invention, there is provided and claimed herein a pad for concrete for appreciably reducing the setting time of concrete comprising an essentially water and air tight flexible cover enclosing a heat insulating cushion resting directly over a lower part intended to be laid directly in contact with the surface of concrete, the improvement wherein the said lower part is made up of a single or of several stacked interconnected fabric plies made of ribbons weaved together, forming a network having a good mechanical resistance to wear by friction and creating a zone between the heat insulating cushion and the surface of the concrete capable of allowing the excess water oozing through the concrete surface to flow only slowly away, thereby avoiding the need of water from an outside source, and allowing also the heat resulting from the setting reaction to accumulate inside the interstices of the said network thus accelerating the setting of the concrete.

Such a pad has proved to be particularly useful and efficient during the year's period of cold weather which of course excessively increases the setting time. Indeed, with such a pad which allows to recuperate and accumulate the heat resulting from the setting reaction while retaining a certain amount of water on the surface of the concrete, it has been noted that the setting time is nearly the same as that during the warmer year's period, namely summer.

Finally, a pad for concrete according to the invention has shown an excellent stability against wind because of its direct contact with the surface of concrete which reduces the possibility for the pad to be blown up by the wind.

BRIEF DESCRIPTION OF THE DRAWINGS

The invention will be better understood with reference to the following description of a preferred embodiment of the invention, which description is made with reference to the accompanying drawings wherein.

DESCRIPTION OF THE PREFERRED EMBODIMENT

Figure 1:
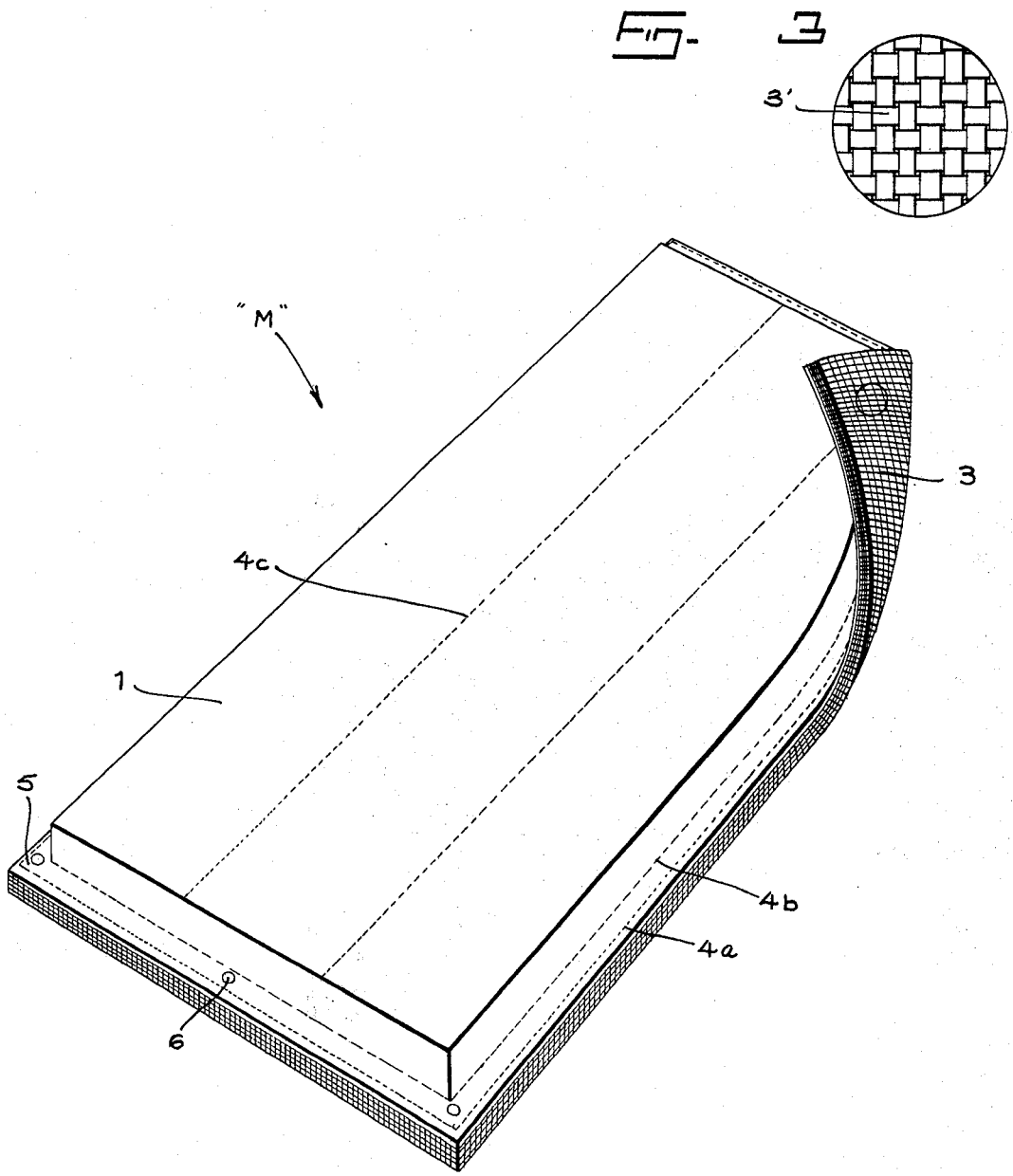
FIG. 1 is a perspective elevation view of a pad for concrete according to the invention.
Figure 2:
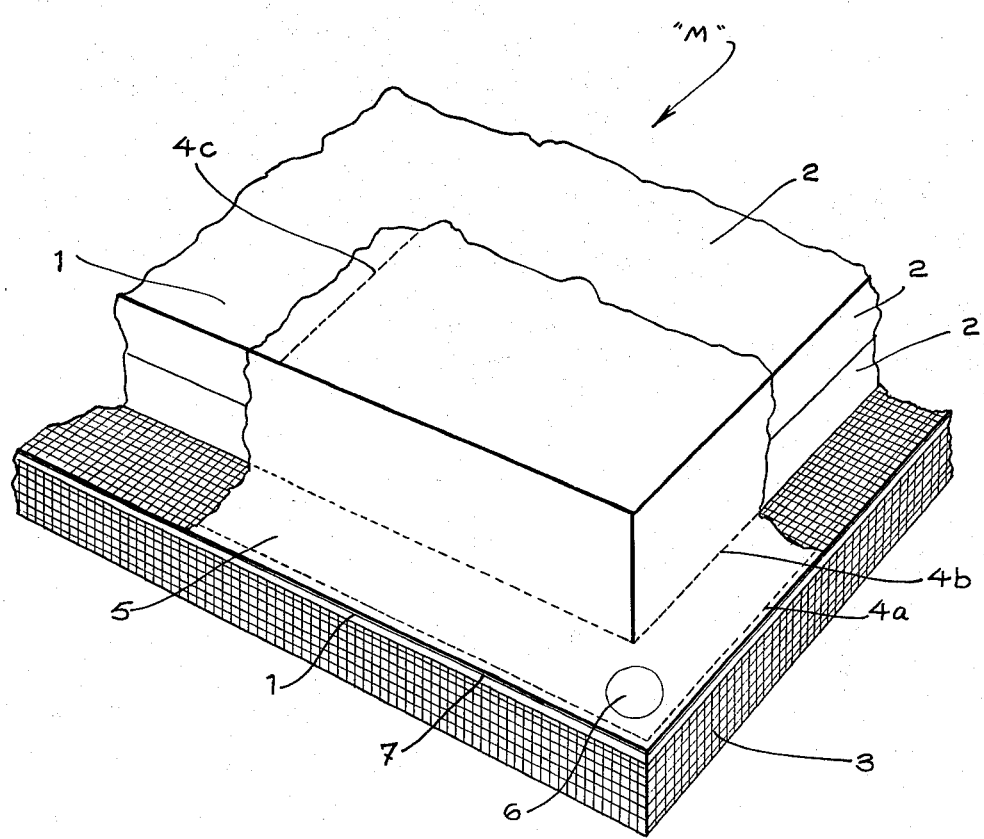
FIG. 2 is a partial perspective view on a larger scale, of the pad of FIG. 1.

The pad M for concrete as shown in FIGS. 1 and 2 is made up of a water and air tight flexible cover 1, a central heat insulating cushion 2 and a network lower part or base 3 which network base is constituted by ribbons 3' made of material such as polypropylene or polyethylene having a small thickness and woven together. Preferably, the ribbons defining a network having a ratio of about 24 weaved ribbons to 10 warp ribbons per square in. The cover 1, the heat insulating cushion 2 and the base 3 which have about the same surface size are bound to each other by seams of threads sown completely through the cover 1, cushion 2 and base 3 along their common periphery.

According to a preferred embodiment of the invention, the base 3 is slightly larger than the cushion 2 so as to leave a projecting edge 5 therebetween and the three elements are bound together by thread seams 4a and 4b respectively sown through the parts near the peripheries of parts 1 and 3 and near the lines defined by the sides of the cushion 3 and the adjacent surface of the base 3, resulting in the edge 5 not being insulated. The seams 4a and 4b may be double.

The non-insulated edge 5 may also comprise, on at least one side a plurality of holes 6 intended to tie the pad to the ground or to another similar pad, by bolts or similar means. Preferably, the holes 6 may be uniformly distributed by sets of 3 on two opposite ends of the pad.

The cover 1, the cushion 2 and the base 3 may also be bound together by one or more thread seams, as shown at 4c, extending through all three parts. This (or those) seams 4c may be also preferably double.

The material of the cover 1 of the pad may be, according to a preferred embodiment of the invention, advantageously consist of a woven material coated, preferably on either sides thereof, with a water and air tight polyethylene film 7. This film may preferably have a thickness of about 1/1000 inch. Furthermore, this film may have a dark color, as black, so that the solar rays it absorbs may further contribute to increase the heat at the surface of concrete and thus further reduce the setting time of the concrete.

The heat insulating cushion 2 is preferably made up of two layers of heat insulating, impermeable and non-corrodable material, as a polyethylene foam with light density and closed cells, having a loss of thickness to water between 2% and 5%, and a tensile strength between 20 and 40 pound per square inch. This cushion 2 with light density and closed cells may be formed of two layers of polyethylene foam having respectively a thickness of about ⅛ inch.

The pad according to the invention may also have the characteristic that the flexible cover 1, the cushion 2 and the base 3 are made of such flexible material that the assembly may be folded or rolled without damaging the parts. Furthermore, during the folding or rolling up of the pad, the air contained inside it may easily be evacuated to facilitate its handling or storing.

The aforesaid pad for concrete, made according to the present invention, may be of any size but to maximize handling and storing problems, a rectangular pad not exceeding 8 by 25 feet is recommended.

The following example shows the advantage and use of the present invention, which example must of course not be considered as limitative.

EXAMPLE

For this example use was made of a pad for concrete comprising a flexible cover constituted of stratified material consisting of a ribbon network coated on either sides thereof, with a black film of water and air tight polyethylene; a central insulating cushion constituted of two layers of a polyethylene foam, said layers having a light density and closed cells, a thickness of about 3/16 of inch, a loss of thickness to water of about 2 to 5%, a tensile strecht of about 20 to 40 psi, and being noncorrodable and impervious to water and air with a water absorption of more or less 0.5%; and a base constituted by a network comprising a set of ribbons having a small thickness, woven together to give a network having a good mechanical resistance to use by friction. These elements are bound to each other with double seams constituted of threads sown across them near the periphery of their respective surface and inside of them at each 2 feet. The pad used in this example was rectangular and had 8 feet by 25 feet. It was, before use, rolled up on itself and provided with 3 holes uniformly distributed on its non isolated side flange at each 8 foot end.

When the weather was cold, a concrete was cast in a wet state mixture to form a floor in a new building. After spreading the concrete into the forms, a pad for concrete according to the aforesaid description was laid onto the surface of concrete. During the use, it was noted that the pad had a good stability on the concrete (i.e. that the wind did not blow it away), that a certain amount of water was maintained at the surface of concrete while the excess water flowed away, and that a temperature above the one noted in the surrounding medium was maintained at the surface of concrete. After 36 hours of setting under the aforesaid conditions, it was possible to remove the pad and walk on the concrete.

What is claimed is:

1. In a pad for concrete for appreciably reducing the setting time of concrete, comprising an essentially water and air tight flexible cover enclosing a heat insulating cushion resting put directly over a lower part intended to be laid directly in contact with the surface of concrete, the improvement wherein the said lower part is made up of ribbons weaved together in the form of a network in such a manner as to have a good mechanical resistance to wear by friction, and so as to create a zone between the heat insulating cushion and the surface of the concrete capable of allowing the excess water oozing through the concrete surface to flow only slowly away thereby avoiding the need of water from an outside source, allowing also the heat resulting from the setting reaction to accumulate inside the interstices of the said network thus may accelerate the setting of the concrete.

2. A pad for concrete according to claim 1, wherein the water and air tight flexible cover is constituted of stratified material made of ribbons woven together to provide a fabric which is then coated on either sides thereof with a water and air tight polymeric film.

3. A pad for concrete according to claim 1, wherein the heat insulating cushion is constituted by at least one layer of impermeable and non-corrodable heat insulating material.

4. A pad for concrete according to claim 1, wherein the water and air tight flexible cover, the heat insulating cushion and the lower part have about the same surface size and are bound to each other by seams of threads sown completely through the cover, the cushion and the lower part along their common periphery.

5. A pad for concrete according to claim 1, wherein the lower part is slightly larger than the cushion so as to leave a projecting edge therebetween, and the three elements are bound together by thread seams respectively sewn through the part near the peripheries of the water and air tight flexible cover and lower part and near the lines defined by the sides of the cushion and the adjacent surface of the lower part, resulting in an edge not being insulated.

6. A pad for concrete according to claim 5, wherein said non-insulated edge comprises at least one hole on at least one side of the pad.

7. A pad for concrete according to claim 1, wherein the water and air tight cover, the heat insulating cushion and the lower part are bound together by thread seams completely sewn through each elements of the pad.

8. A pad for concrete according to claim 3, wherein said heat insulating cushion is made up of two layers of heat insulating, impermeable and non-corradable material.

9. A pad for concrete according to claim 8, wherein said heat insulating, impermeable and non-corrodable material is made of polyethylene foam having a light density and closed cells, a loss of thickness due to water between 2 and 5%, and a tensile strength between 20 and 40 psi.

10. A pad for concrete according to claim 8, wherein said heat insulating impermeable and non-corrodable material has a thickness of about the half of an inch.

11. A pad for concrete according to claim 1, wherein the water and air tight flexible cover, the heat insulating cushion and the lower part are made of flexible material that can be folded or rolled up.

* * * * *